(12) United States Patent
Aoki

(10) Patent No.: US 12,361,967 B2
(45) Date of Patent: Jul. 15, 2025

(54) HEAD SUSPENSION ASSEMBLY AND DISK DEVICE

(71) Applicants: Kabushiki Kaisha Toshiba, Tokyo (JP); Toshiba Electronic Devices & Storage Corporation, Tokyo (JP)

(72) Inventor: Kenichiro Aoki, Tokyo (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 18/243,518

(22) Filed: Sep. 7, 2023

(65) Prior Publication Data

US 2024/0321299 A1    Sep. 26, 2024

(30) Foreign Application Priority Data

Mar. 24, 2023  (JP) .................. 2023-048558

(51) Int. Cl.
   *G11B 5/48*  (2006.01)
(52) U.S. Cl.
   CPC ............ *G11B 5/486* (2013.01); *G11B 5/4833* (2013.01); *G11B 2220/2516* (2013.01)
(58) Field of Classification Search
   None
   See application file for complete search history.

(56) References Cited

U.S. PATENT DOCUMENTS

| | | | |
|---|---|---|---|
| 9,013,963 B2 | 4/2015 | Ver Meer | |
| 9,087,531 B1 | 7/2015 | Yamada | |
| 10,475,476 B2 | 11/2019 | Yamada | |
| 11,195,549 B1 | 12/2021 | Nojima | |
| 11,282,539 B2 | 3/2022 | Kudo | |
| 11,437,069 B2 | 9/2022 | Matsumoto et al. | |
| 2004/0228036 A1* | 11/2004 | Yamaguchi | G11B 5/4853 |
| 2007/0002500 A1* | 1/2007 | Yao | G11B 5/5556 |
| 2009/0266789 A1* | 10/2009 | Shimazawa | G11B 5/102 |
| | | | 216/22 |
| 2013/0342936 A1* | 12/2013 | Nishiyama | H05K 1/056 |
| | | | 174/250 |

FOREIGN PATENT DOCUMENTS

| | | | | | |
|---|---|---|---|---|---|
| CN | 102081930 A | * | 6/2011 | ............ | G11B 5/486 |
| CN | 102376313 A | * | 3/2012 | ............ | G11B 5/105 |
| CN | 108962287 B | * | 3/2020 | ............ | G11B 5/4826 |
| JP | 2005251262 A | * | 9/2005 | ............ | G11B 5/484 |
| WO | WO-2012121032 A1 | * | 9/2012 | ............ | G11B 5/4806 |
| WO | WO-2013163409 A1 | * | 10/2013 | ............ | G11B 13/04 |

* cited by examiner

*Primary Examiner* — William J Klimowicz
(74) *Attorney, Agent, or Firm* — Maier & Maier, PLLC

(57) ABSTRACT

According to one embodiment, a head suspension assembly includes a support plate, a wiring member on the support plate, and a magnetic head mounted on the wiring member. The magnetic head includes a slider, a head element, connection pads, and a laser oscillation element on the slider. The wiring member includes a plurality of first connection terminals each having a bonding surface bonded to a connection pad of the slider and a second connection terminal including a bonding surface bonded to a connection pad of the laser oscillation element and a non-bonding surface opposite to the bonding surface. The wiring member includes a cover layer covering at least a part of the non-bonding surface of the second connection terminal.

9 Claims, 9 Drawing Sheets

HEAD SUSPENSION ASSEMBLY AND DISK DEVICE

CROSS-REFERENCE TO RELATED APPLICATIONS

This application is based upon and claims the benefit of priority from Japanese Patent Application No. 2023-048558, filed Mar. 24, 2023, the entire contents of which are incorporated herein by reference.

FIELD

Embodiments described herein relate generally to a head suspension assembly and a disk device including the same.

BACKGROUND

As a disk device, a hard disk drive (HDD), for example, comprises a plurality of magnetic disks rotatably arranged in a housing, a plurality of magnetic heads that read and write information to and from the magnetic disks, and a head actuator that movably supports the magnetic heads with respect to the magnetic disks. The head actuator has a plurality of head suspension assemblies (in some cases referred to as a head gimbal assembly (HGA)) that support the magnetic heads at their distal ends. The head suspension assembly includes a support plate and a flexure (wiring member) on the support plate. The flexure has a displaceable gimbal portion, and a magnetic head is mounted on the gimbal portion.

A heat-assisted magnetic head that applies a laser beam to a magnetic disk has also been proposed. This magnetic head has a slider with an embedded head elements and a laser diode unit (LDU) installed on the rear side of the slider. The head elements are connected to connection terminals on one side of the flexure. The LDU is electrically connected to connection terminals exposed on the other side of the flexure.

In the HDD having the above configuration, the connection terminals for the LDU of the flexure are supported in a cantilever shape protruding from the base layer of the flexure and are exposed on one side and the other side of the flexure. Therefore, the connection terminals are not rigid enough and may bend. In a case where the connection terminal is bent, the distance between the connection terminal and a connection pad of the LDU is unstable during solder bonding, which may worsen the bonding yield. In addition, cracks may occur in the solder and connection terminals in a case where the HDD is subjected to shocks or due to heat cycles caused by long-term use.

DETAILED DESCRIPTION

Figure 1:
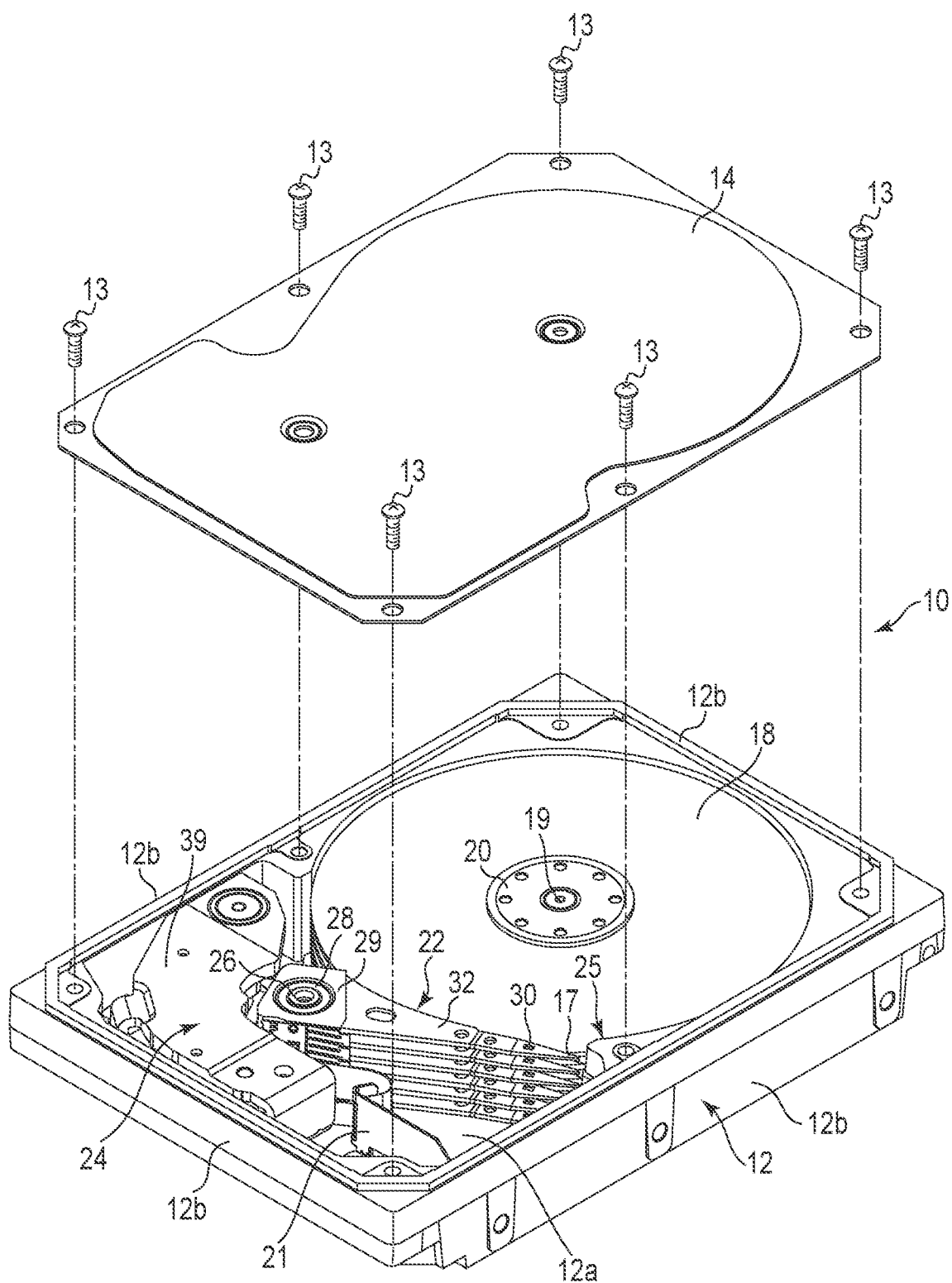
FIG. 1 is a perspective view showing a hard disk drive (HDD) according to a first embodiment with a top cover disassembled.

Various embodiments will be described hereinafter with reference to the accompanying drawings. In general, according to one embodiment, a head suspension assembly comprises: a support plate; a wiring member including a displaceable gimbal portion and provided on the support plate; and a magnetic head mounted on the gimbal portion, comprising a slider, a head element provided in the slider, connection pads provided on the slider, and a laser oscillation element provided on the slider and having a connection pad. The wiring member includes a metal plate, a base insulating layer provided on the metal plate, a conductive layer formed on the base insulating layer and configuring a plurality of wiring lines and a plurality of connection terminals, and a cover insulating layer overlaid on the conductive layer and the base insulating layer. The plurality of connection terminals include a plurality of first connection terminals each having a bonding surface bonded to a connection pad of the slider and a second connection terminal including a bonding surface bonded to the connection pad of the laser oscillation element and a non-bonding surface opposite to the bonding surface. The wiring member includes a cover layer covering at least a part of the non-bonding surface of the second connection terminal.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings are denoted by like reference numerals, and a detailed description thereof may be omitted unless otherwise necessary.

First Embodiment

A hard disk drive (HDD) according to a first embodiment will be described in detail as a disk device.

FIG. 1 is an exploded perspective view of the HDD according to the first embodiment shown with a top cover removed.

As shown in FIG. 1, the HDD comprises a rectangular-shaped housing 10. The housing 10 has a rectangular boxshaped base 12 with an open top surface and a cover (top cover) 14. The base 12 includes a rectangular bottom wall 12a and side walls 12b erected along the periphery of the bottom wall 12a, and is integrally molded, for example, from aluminum. The cover 14 is formed into a rectangular plate shape, for example, by stainless steel. The cover 14 is screwed onto the side walls 12b of the base 12 with a plurality of screws 13 to hermetically close the upper opening of the base 12.

Inside the housing 10 are provided a plurality of magnetic disks 18 as disk-shaped recording media, e.g., five magnetic disks, and a spindle motor 19 that supports and rotates the magnetic disks 18. The spindle motor 19 is located on the bottom wall 12a. Each magnetic disk 18 includes a substrate, for example, formed as a disk of 95 mm (3.5 inches) in diameter and made of a non-magnetic material such as glass, and a magnetic recording layer formed on the top (first side) and bottom (second side) surfaces of the substrate. Each magnetic disk 18 is coaxially fitted to the hub of the spindle motor 19 with respect to each other and is further clamped by a clamping spring 20. As a result, the magnetic disks 18 are supported at predetermined intervals, parallel to each other and approximately parallel to the bottom wall 12a. The multiple magnetic disks 18 are rotated at a predetermined speed by the spindle motor 19. Note that, the number of magnetic disks 18 mounted is not limited to five, but may be 10 or more or 12 or less.

Inside the housing 10 are provided a plurality of magnetic heads 17 that record and reproduce information on the magnetic disk 18, and an actuator assembly 22 that supports these magnetic heads 17 in a movable manner with respect to the magnetic disk 18. Also inside the housing 10 are a voice coil motor (VCM) 24 that rotates and positions the actuator assembly 22, a ramp load mechanism 25 that holds the magnetic heads 17 in an unloaded position away from the magnetic disk 18 when the magnetic heads 17 have moved to the outermost periphery of the magnetic disk 18, and a board unit (FPC unit) 21 on which electronic components such as a conversion connector are mounted. The VCM 24 includes a pair of yokes 39 provided on the bottom wall 12a and a magnet fixed to the yokes 39 (not shown). The ramp load mechanism 25 includes a ramp (not shown) erected on the bottom wall 12a.

A printed circuit board (not shown) is screwed to the outer surface of the bottom wall 12a. The printed circuit board configures a controller that controls the operation of the spindle motor 19 as well as the VCM 24 and the magnetic head 17 via the board unit 21.

Figure 2:
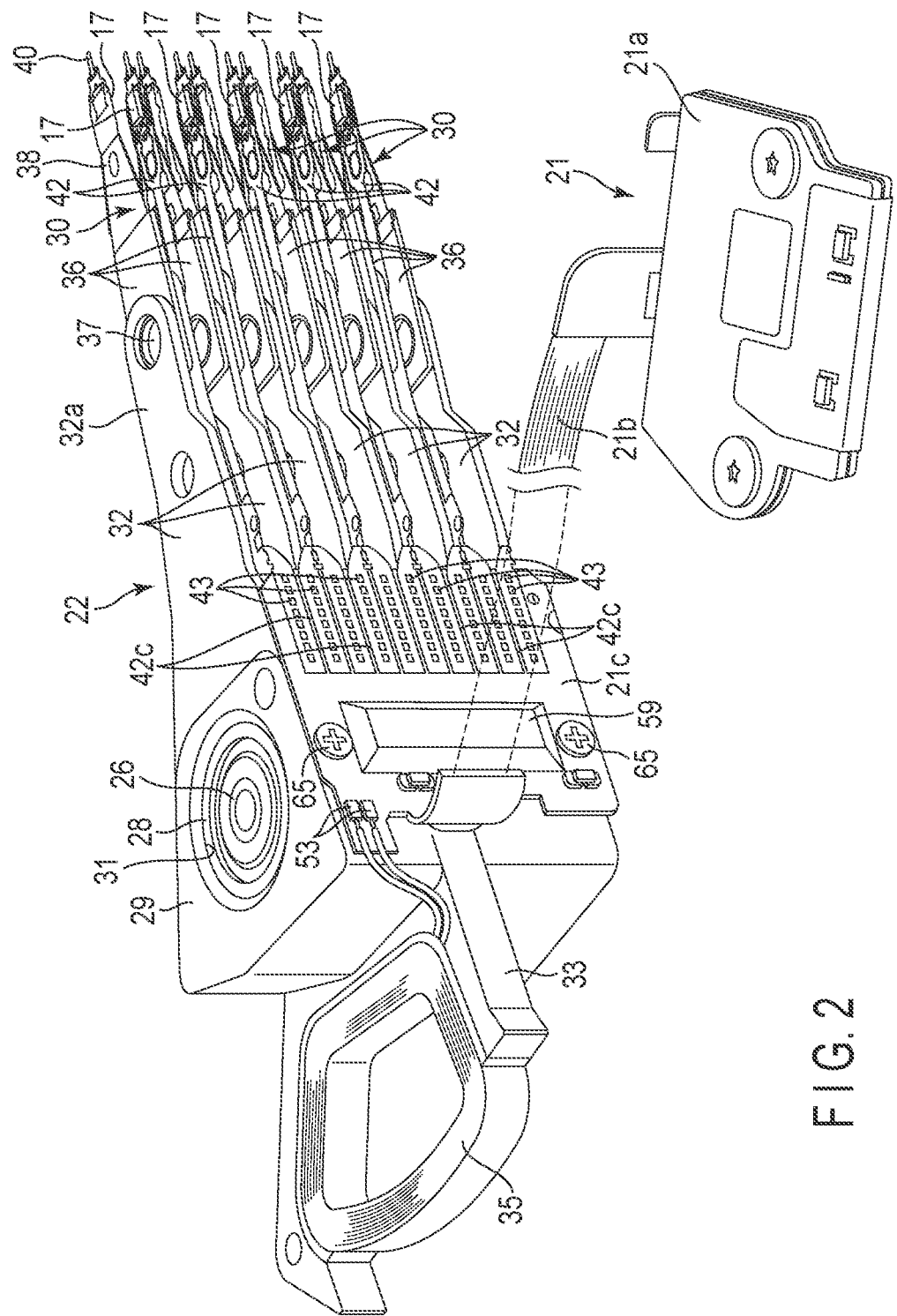
FIG. 2 is a perspective view showing an actuator assembly and a board unit of the HDD.

FIG. 2 is a perspective view showing the actuator assembly and the board unit. As shown in the drawing, the actuator assembly 22 comprises an actuator block 29 having a perforation 31, a bearing unit (unit bearing) 28 provided in the perforation 31, a plurality of arms 32, e.g., six arms, extending from the actuator block 29, a head suspension assembly (in some cases, referred to as a head gimbal assembly: HGA) 30 attached to each arm 32, and the magnetic head 17 supported by the head suspension assembly 30. A support shaft (pivot axis) 26 is erected on the bottom wall 12a of the base 12. The actuator block 29 is supported by the bearing unit 28, around the support shaft 26, in a rotatable manner.

In the present embodiment, the actuator block 29 and the six arms 32 are integrally molded from aluminum, etc., to configure a so-called E-block. The arm 32 is formed, for example, in the shape of an elongated flat plate, and extends from the actuator block 29 in a direction perpendicular to the support shaft 26. The six arms 32 are parallel to each other with a gap between them.

The actuator assembly 22 has a support frame 33 extending from the actuator block 29 in a direction opposite to the arms 32. The support frame 33 supports a voice coil 35, which configures a part of the VCM 24. As shown in FIG. 1, the voice coil 35 is located between a pair of yokes 39, and, together with these yokes 39 and a magnet fixed to the yokes, configures the VCM 24.

As shown in FIG. 2, the actuator assembly 22 comprises ten head suspension assemblies 30, each supporting the magnetic head 17. The plurality of head suspension assemblies 30 include an up-head suspension assembly that supports the magnetic head 17 upwardly and a down-head suspension assembly that supports the magnetic head 17 downwardly. These up-head suspension assembly and down-head suspension assembly are configured by arranging the head suspension assemblies 30 of the same structure in different vertical orientations.

In the present embodiment, in FIG. 2, the down-head suspension assembly 30 is attached to the uppermost arm 32 and the up-head suspension assembly 30 is attached to the lowermost arm 32. Each of the four middle arms 32 has the up-head suspension assembly 30 and the down-head suspension assembly 30 attached thereto.

The head suspension assembly 30 has an approximately rectangular base plate 36, a load beam 38 made of an elongated leaf spring, and an elongated strip-shaped flexure (wiring member) 42. The flexure 42 has a gimbal portion, which will be described later, on which the magnetic head 17 is placed. The proximal end of the base plate 36 is fixed to a distal end 32a of the arm 32. The load beam 38 is fixed with its proximal end overlapping the distal end of the base plate 36. The load beam 38 extends from the base plate 36 and tapers toward the extended end. The load beam 38 produces a spring force (reaction force) that urges the magnetic head 17 toward the surface of the magnetic disk 18. A tab 40 protrudes from the distal end of the load beam 38. The tab 40 is engageable with the aforementioned ramp and together with the ramp configures the ramp load mechanism 25.

As shown in FIG. 2, the FPC unit 21 integrally comprises an approximately rectangular base portion 21a, an elongated strip-shaped relay portion 21b extending from one side edge of the base portion 21a, and a joint portion 21c continuously provided at the distal end of the relay portion 21b. The base portion 21a, the relay portion 21b, and the joint portion 21c are formed by a flexible printed circuit board (FPC). On the base portion 21a, electronic components such as a conversion connector and a plurality of capacitors (not shown) are mounted and electrically connected to a wiring line (not shown).

The relay portion 21b extends from the side edge of the base portion 21a toward the actuator block 29. The joint portion 21c is formed in a rectangular shape with a height and width approximately equal to the side (installation surface) of the actuator block 29. The joint portion 21c is affixed to the installation surface of the actuator block 29 via a backing plate made of aluminum or the like, and is further screwed and fixed to the installation surface with fixing screws 65. A plurality of connection pads are provided on the joint portion 21c. For example, one head IC (head amplifier) 59 is mounted on the joint portion 21c, and this head IC 59 is connected to the connection pads and the base portion 21a via a wiring line. Furthermore, a connection pad 53 to which the voice coil 35 is connected is provided on the joint portion 21c.

The flexure 42 of each head suspension assembly 30 includes one end electrically connected to the magnetic head 17, another end extending through a side edge of the arm 32 to the actuator block 29, and a connection end (tail connection terminal portion) 42c at the other end. The connection end 42c is formed in an elongated rectangular shape. A plurality of connection terminals (connection pads) 43 are provided on the connection end 42c. These connection pads 43 are connected to a wiring line of the flexure 42, respectively. In other words, a plurality of wiring lines of the flexure 42 extend over almost the entire length of the flexure 42, one end is electrically connected to the magnetic head 17, and the other end is connected to the connection pad 43.

The connection pad 43 provided at the connection end 42c is bonded to the connection pad of the joint portion 21c and electrically connected to the wiring line of the joint portion 21c. As a result, the ten magnetic heads 17 of the actuator assembly 22 are electrically connected to the base portion 21a through the wiring line of the flexure 42, the connection end 42c, the joint portion 21c of the FPC unit 21, and the relay portion 21b, respectively.

With the actuator assembly 22 configured above assembled on the base 12, the support shaft 26 is erected approximately parallel to a spindle of the spindle motor 19, as shown in FIG. 1. Each magnetic disk 18 is positioned between two head suspension assemblies 30. During HDD operation, the magnetic heads 17 supported by the two head suspension assemblies 30 face the top and bottom surfaces of the magnetic disk 18, respectively.

Next, the configuration of the head suspension assembly 30 will be described in detail.

Figure 3:
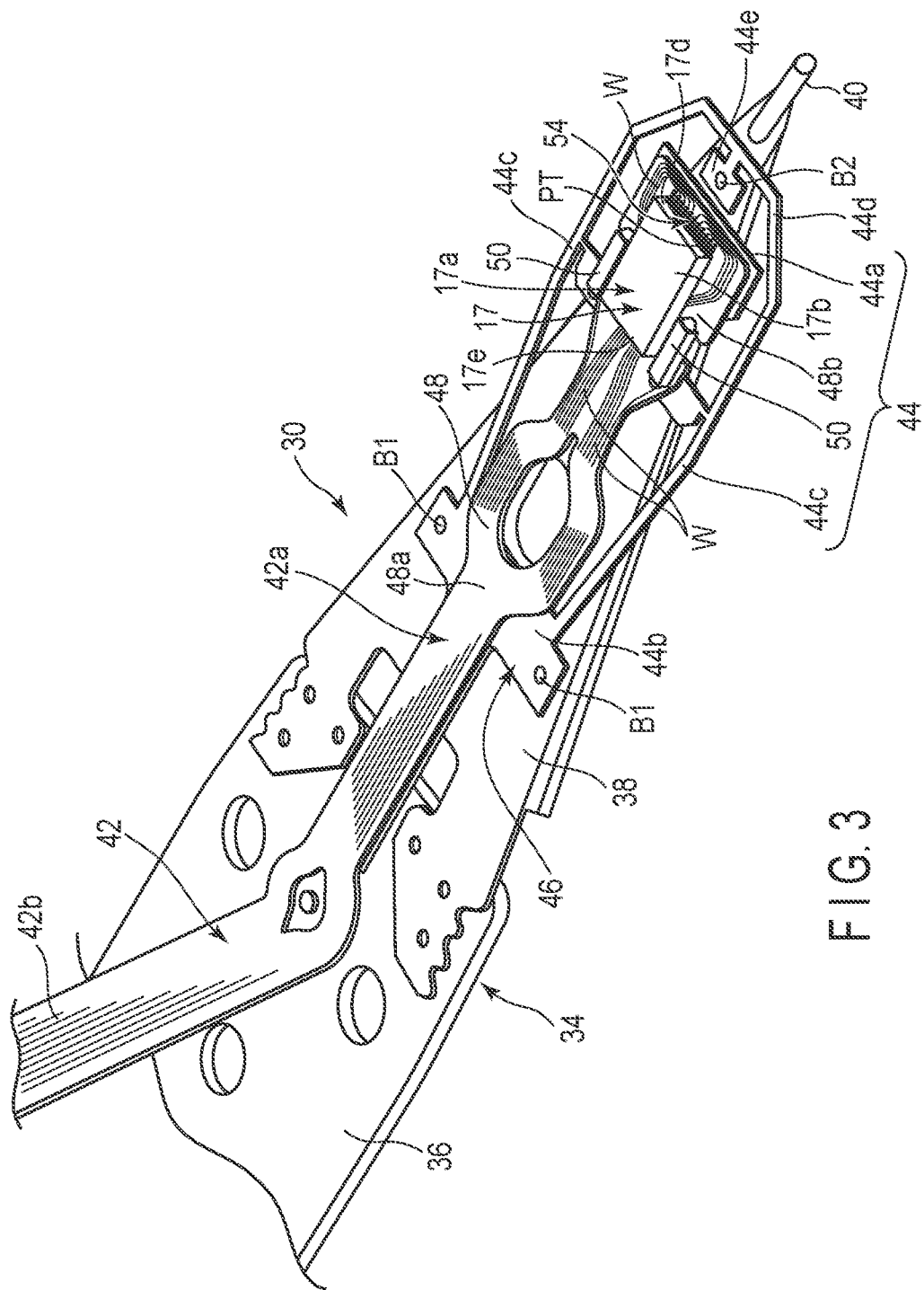
FIG. 3 is a perspective view showing a head suspension assembly of the head actuator assembly.
Figure 4:
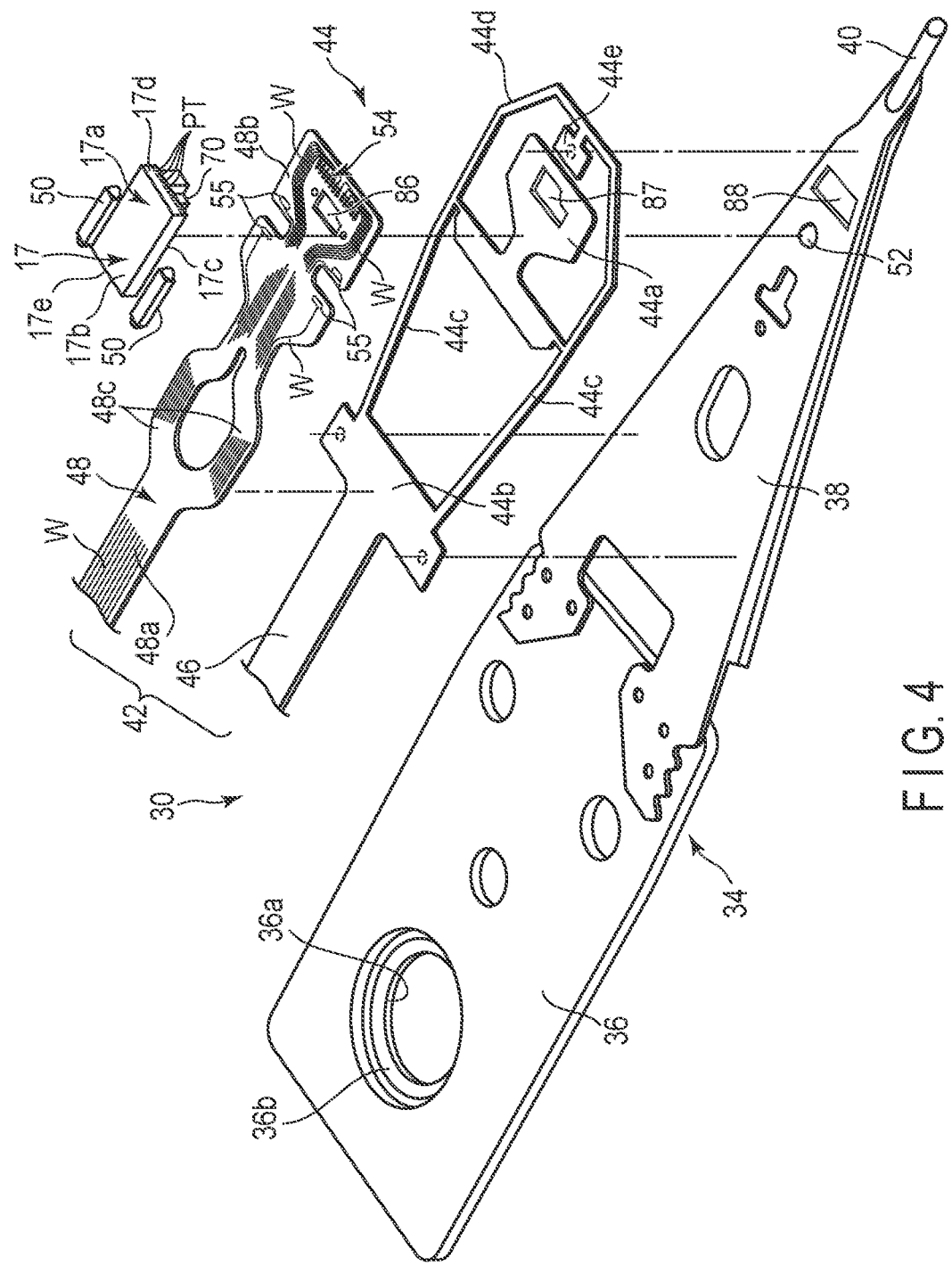
FIG. 4 is an exploded perspective view of the head suspension assembly.
Figure 5:
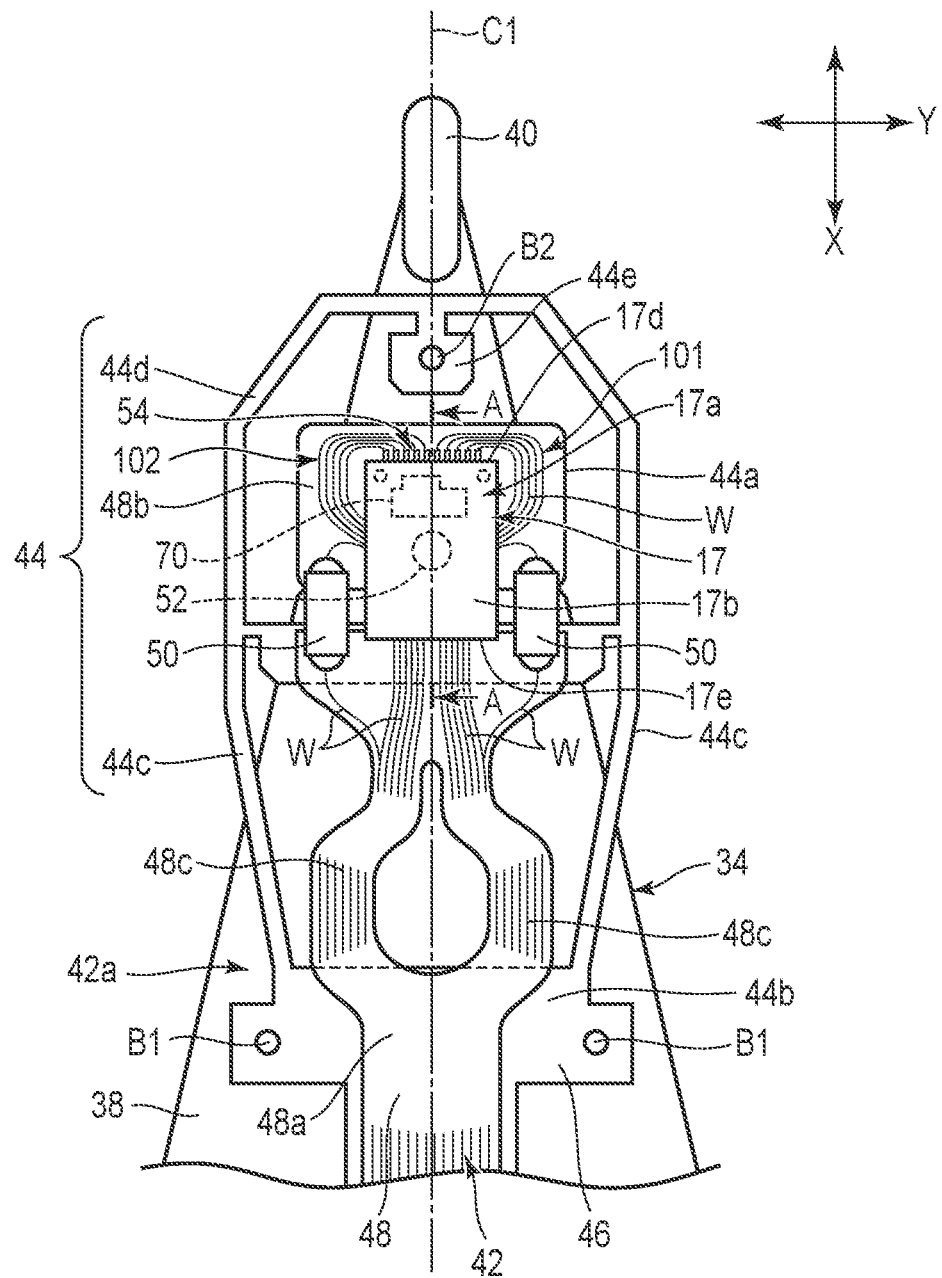
FIG. 5 is a plan view showing a magnetic head side of the head suspension assembly.

FIG. 3 is a perspective view showing the magnetic head side of the head suspension assembly, FIG. 4 is an exploded perspective view of the head suspension assembly, and FIG. 5 is a plan view of the head suspension assembly.

As shown in FIG. 3 and FIG. 4, the head suspension assembly 30 has a suspension 34 that serves as a support plate. The suspension 34 has a rectangular base plate 36 made of a metal plate several hundred microns thick and an elongated load beam 38 made of a metal plate several tens of microns thick. The load beam 38 is fixed to the base plate 36 by having its proximal end overlap the distal end of the base plate 36 and welded in several places. The distal end of the load beam 38 configures the distal end of the support plate. A bar-shaped tab 40 is protruded at the distal end of the load beam 38.

As shown in FIG. 4, on the proximal end, the base plate 36 has a circular opening 36a and a circular projection 36b located around the opening 36a. The base plate 36 is fastened to the distal end 32a of the arm 32 by fitting the projection 36b into a circular clamping hole formed on a clamping seat surface of the arm 32 (not shown) and clamping this projection 36b. The proximal end of the base plate 36 may be fixed to the distal end 32a of the arm 32 by laser welding, spot welding or gluing.

The head suspension assembly 30 comprises the elongated strip-shaped flexure (wiring member) 42 for transmitting record signals, read signals and drive signals, a pair of piezoelectric elements (e.g., PZT elements) 50 mounted on the flexure 42, and the magnetic head 17. As shown in FIG. 2 and FIG. 3, the flexure 42 includes a distal end side portion 42a disposed on the load beam 38 and the base plate 36, a proximal end side portion 42b extending outward from a side edge of the base plate 36 and along a side edge of the arm 32 to the actuator block 29, and the connection end 42c provided at the extended end of the proximal end side portion 42b. The connection end 42c has a plurality of connection pads (electrode pads) 43. These connection pads 43 are electrically bonded to connection terminals of the joint portion 21c installed in the actuator block 29.

As shown in FIG. 3, FIG. 4, and FIG. 5, the distal end portion of the flexure 42 is located above the distal end portion of the load beam 38 and configures a gimbal portion 44 that functions as an elastic support portion. The magnetic head 17 is mounted on and fixed to the gimbal portion 44 and is supported by the load beam 38 through the gimbal portion 44. The pair of piezoelectric elements 50 as driving elements are mounted on the gimbal portion 44 and are disposed on both sides of the magnetic head 17.

The flexure 42 includes a metal sheet 46, such as stainless steel, which serves as a base (base metal sheet), and a belt-shaped laminated member (flexible printed circuit board: FPC) 48, which is attached or fixed on the metal sheet 46, and forms an elongated laminated board. The laminated member (FPC) 48 includes a base insulating layer 60 mostly fixed to the metal sheet 46, a conductive layer (wiring pattern) 62 formed on the base insulating layer 60 and configuring a plurality of signal wiring lines, a drive wiring line, a plurality of connection terminals, or a plurality of connection pads, and a cover insulating layer 64 covering the conductive layer 62 and laminated on the base insulating layer 60 (see FIG. 8). In one example, the base insulating layer 60 and the cover insulating layer 64 are formed of polyimide. For example, a copper foil is used as the conductive layer 62, and by patterning this copper foil, a plurality of signal wiring lines, drive wiring lines, connection terminals, and connection pads are formed.

In the distal end side portion 42a of the flexure 42, the metal sheet 46 is affixed or spot-welded at a plurality of welding points on the surfaces of the load beam 38 and the base plate 36. In one example, the metal sheet 46 has two welding points B1 welded to the proximal end of the load beam 38 and one welding point (second weld) B2 welded to the distal end of the load beam 38.

In the gimbal portion 44, the metal sheet 46 integrally includes a substantially rectangular tongue portion 44a located on the distal end side, a substantially rectangular proximal end portion 44b located on the proximal end side with a space therebetween the tongue portion 44a, a pair of elastically deformable outriggers 44c respectively connecting the proximal end portion 44b and the tongue portion 44a and supporting the tongue portion 44a in a displaceable manner, a connecting frame 44d extending from one outrigger 44c around the distal end side of the tongue portion 44a to the other outrigger 44c, and a substantially rectangular fixed pad portion (second end) 44e extending from the connecting frame 44d and facing the distal end side of the tongue portion 44a. The fixed pad portion 44e is located between the connecting frame 44d and the tongue portion 44a.

The proximal end portion 44b is affixed on the surface of the load beam 38 and spot-welded to the load beam 38 at the welding points B1. The fixed pad portion 44e is spot-welded to the distal end of the load beam 38 at the welding point B2. The welding point B2 is located on a central axis C1 of the suspension 34.

As shown in FIG. 4, the tongue portion 44a is formed in a size and shape that enables the magnetic head 17 to be mounted thereon, such as substantially rectangular. The tongue portion 44a is arranged so that its central axis in the width direction is aligned with the central axis C1 of the suspension 34. The tongue portion 44a is connected to the outrigger 44c at a rear end located on the proximal end portion 44b side. The tongue portion 44a has its substantial center portion in contact with a dimple (convexity) 52 protruding from the distal end of the load beam 38. The tongue portion 44a can be displaced in various directions using the dimple 52 as a fulcrum by elastic deformation of the pair of outriggers 44c and the connecting frame 44d. As a result, the tongue portion 44a and the magnetic head 17 mounted on the tongue portion 44a can flexibly follow the surface variation of the magnetic disk 18 and be displaced in a roll or pitch direction to maintain a small gap between the surface of the magnetic disk 18 and the magnetic head 17.

As shown in FIG. 3, FIG. 4, and FIG. 5, in the gimbal portion 44, the laminated member 48 of the flexure 42 is disposed on the metal sheet 46 and extends from the proximal end portion 44b to the top of the tongue portion 44a. That is, the laminated member 48 has a proximal end portion 48a affixed on the proximal end portion 44b, a distal end portion 48b affixed to the tongue portion 44a, and a pair of strip-shaped bridge portions 48c extending in a two-way fashion from the proximal end portion 48a to the distal end portion 48b. The distal end portion 48b configures a head installation area where the magnetic head 17 is mounted.

The distal end portion 48b is provided with a plurality of connection terminals 54 aligned in a width direction Y. The distal end portion 48b is also provided with a plurality of connection pads (electrode pads) 55 for connecting the piezoelectric element 50. The laminated member 48 includes a plurality of signal wiring lines W extending from the connection terminals 54 around both edges of the distal end portion 48b to the proximal end portion 48a side, and a plurality of drive wiring lines W extending from the connection pads 55 to the proximal end portion 48a side. These signal wiring lines W and drive wiring lines W extend over almost the entire length of the laminated member 48 and are connected to the connection pads 43 of the connection end 42c.

As shown in FIG. 4, a substantially rectangular through hole 86 is provided in the central portion of the distal end portion 48b, particularly in an area where the wiring lines W do not exist. A substantially rectangular through hole 87 is formed in the central portion of the tongue portion 44a. The through hole 87 has approximately the same shape and dimensions as the through hole 86 and is located facing the through hole 86. Furthermore, a substantially rectangular through hole 88 is formed at the distal end portion of the load beam 38. The through hole 88 has approximately the same dimensions as or larger dimensions than the through hole 87 and is located facing the through holes 86 and 87. As described below, a laser oscillation element is inserted through the through holes 86, 87, and 88.

Figure 6:
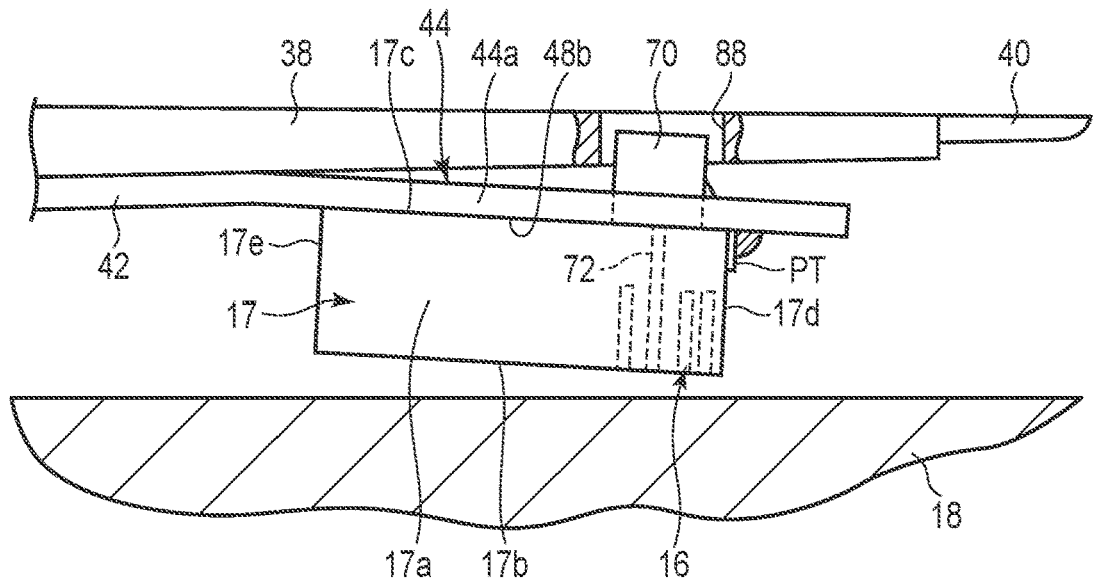
FIG. 6 is a side view schematically showing a magnetic head portion of the head suspension assembly.

FIG. 6 is a side view schematically showing the distal end of the head suspension assembly and the magnetic head. As shown in the drawing, the magnetic head 17 comprises a substantially flat rectangular parallelepiped slider 17a and a head portion (including a recording element (write head) and a read element (read head)) 16 provided in the slider 17a. The slider 17a includes a top surface (ABS) 17b facing the surface of the magnetic disk 18, a back surface 17c on the opposite side, an outflow end 17d located on the distal end side of the load beam 38, and an inflow end 17e located on the proximal end side of the load beam 38. The magnetic head 17 is placed on the tongue portion 44a by overlapping the distal end portion 48b with the back surface 17c of the slider 17a facing the distal end portion 48b, and is fixed to the tongue portion 44a by an adhesive.

The magnetic head 17 has a plurality of connection pads PT provided on the outflow end 17d of the head slider 17a. These connection pads PT are electrically connected to the head portion (recording element, read element, heater, etc.) 16 of the magnetic head 17. As described below, each connection pad PT is soldered to the connection terminal of the flexure 42.

The magnetic head 17 further comprises a semiconductor laser, i.e., a laser diode unit (LDU) 70, as a heat assist element or laser oscillation element, and a waveguide 72 that guides a laser beam emitted from the LDU 70 toward the magnetic disk 18. The waveguide 72 is provided within the slider 17a. The LDU 70 is installed on the back surface 17b of the slider 17a. The LDU 70 passes through the through holes 86 and 88 of the gimbal portion 44 and is inserted into the through hole 88 of the load beam 38. As described below, the connection pads of the LDU 70 are soldered to the connection terminals of the flexure 42. The laser beam generated from the LDU 70 is input to the waveguide 72 and fed through this waveguide 72 to the magnetic disk 18.

Figure 7:
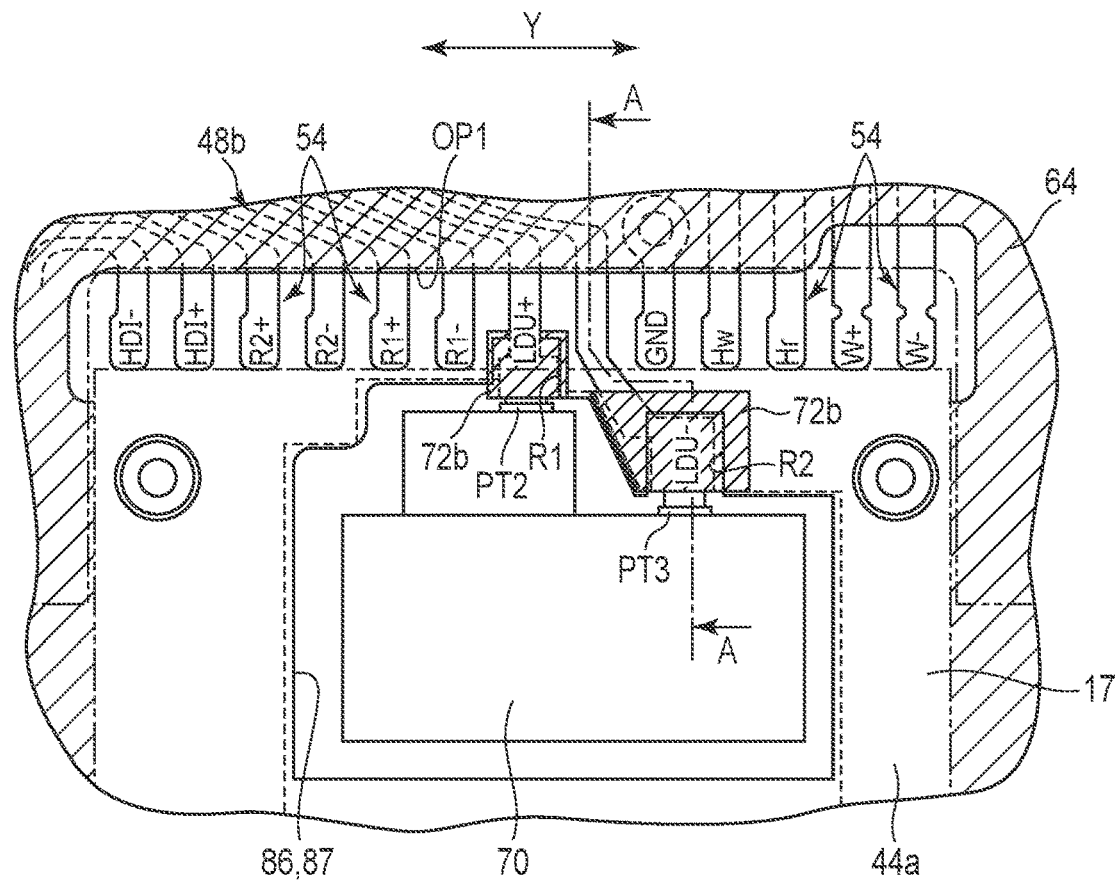
FIG. 7 is a plan view showing connection terminals of a gimbal portion, a magnetic head, and a laser diode unit (LDU) in the head suspension assembly.
Figure 8:
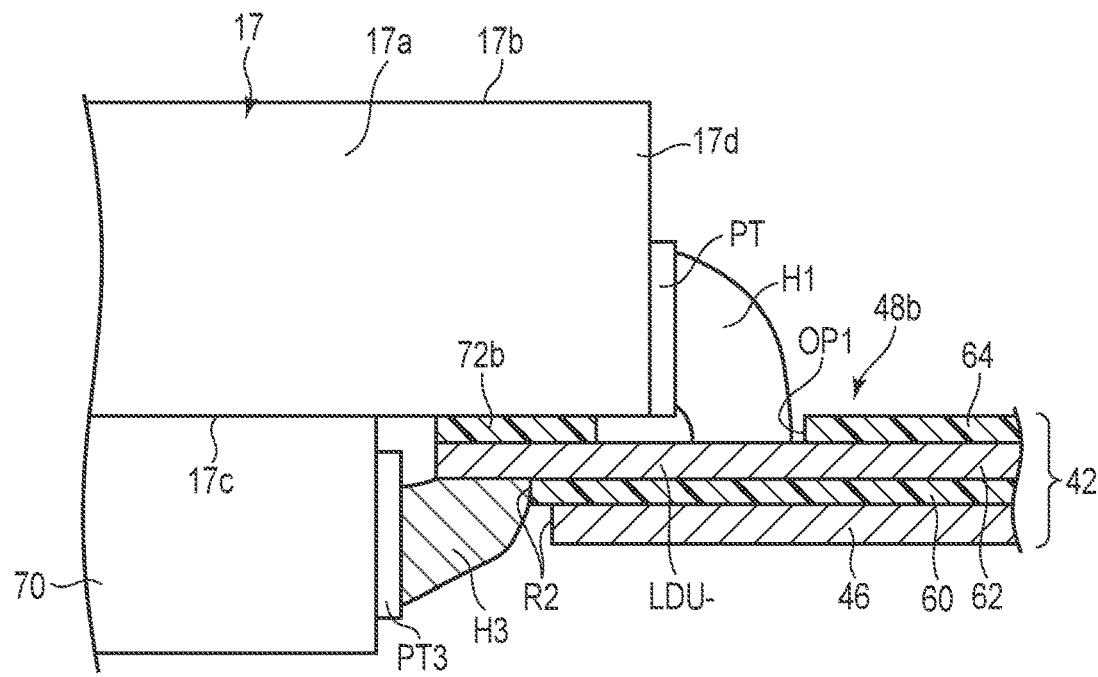
FIG. 8 is a cross-sectional view of a head joint portion taken along line A-A in FIG. 7.

The joint structure between the magnetic head 17 and the flexure 42 will be described. FIG. 7 is a plan view showing the connection terminals of the gimbal portion 44, the magnetic head, and the LDU in the head suspension assembly 30. FIG. 8 is a cross-sectional view of the head joint portion taken along line A-A in FIG. 7.

As shown in FIG. 7, the magnetic head 17 is installed on the tongue portion 44a, and the LDU 70 is inserted through the through holes 86 and 87. A plurality of connection terminals 54, e.g., 13, are provided at the distal end portion 48b of the flexure 42. These connection terminals 54 are arranged in parallel with each other at intervals in the width direction Y. In one example, the connection terminals 54 include connection terminals W+ and W− for the write head, connection terminals Hw and Hr for the heater, a connection terminal GND for ground, connection terminals LDU+ and LDU− for the LDU, connection terminals R1+, R1−, R2+, and R2− for the read head, and connection terminals HDI+ and HDI− for an HDI sensor.

Note that the connection terminals LDU+ and LDU− for the LDU may be referred to as second connection terminals, and the other connection terminals may be referred to as first connection terminals.

As shown in FIG. 7 and FIG. 8, at the distal end portion 48b, an opening OP1 is formed in the cover insulating layer 64. The plurality of connection terminals 54 are located within the opening OP1. That is, the top surfaces (bonding surfaces) of the plurality of connection terminals 54 are exposed in the opening OP1 without being covered by the cover insulating layer 64. The bottom surfaces (non-bonding surfaces) of the connection terminals 54 are covered by the base insulating layer 60. A plurality of connection pads PT of the magnetic head 17 mounted on the tongue portion 44a are each bonded to the bonding surface of the corresponding connection terminal (except LDU+ and LDU−) 54 by solder H1. As a result, the head portion 16 of the magnetic head 17 is electrically connected to the wiring lines of the flexure 42.

The connection terminals LDU+ and LDU− for the LDU protrude beyond the opening OP1 to the through holes 86 and 87 side, i.e., to the LDU 70 side, respectively. In addition, rectangular recesses R1 and R2 opening into the through holes 86 and 87 are formed respectively in the metal sheet 46 and the base insulating layer 60 of the distal end portion 48b. The extended end of the connection terminal LDU+ is located in the recess R1, i.e., protruding from the base insulating layer 60 into the recess R1. As a result, the top and bottom surfaces (bonding surfaces) of the extended end of the connection terminal LDU+ are exposed to the recess R1. The connection pad PT2 of the LDU 70 is bonded to the bottom surface (bonding surface) of the extended end of the connection terminal LDU+ by solder H2.

Similarly, the extended end of the connection terminal LDU− is located inside the recess R2, i.e., protruding from the base insulating layer 60 into the recess R2. As a result, the top and bottom surfaces (bonding surfaces) of the extended end of the connection terminal LDU− are exposed to the recess R2. A connection pad PT3 of the LDU 70 is bonded to the bottom surface (bonding surface) of the extended end of the connection terminal LDU− by solder H3. As a result, the LDU 70 is electrically connected to the wiring lines of the flexure 42.

According to the present embodiment, reinforcing cover layers 72a and 72b are provided to increase the strength of the connection terminals LDU+ and LDU−. In one example, the cover layers 72a and 72b are made of polyimide. The cover layer 72a has a rectangular shape with dimensions larger than the recess R1. The cover layer 72a is overlaid on the tongue portion 44a and covers the top surface (non-bonding surface) of the extended end of the connection terminal LDU+ and the recess R1. The cover layer 72b has a rectangular shape with dimensions larger than the recess R2. The cover layer 72b is overlaid on the tongue portion 44a and covers the top surface (non-bonding surface) of the extended end of the connection terminal LDU− and the recess R2.

The cover layers 72a and 72b may be either independent cover layers or mutually connected cover layers.

Note that, as shown in FIG. 8, according to the present embodiment, the end portion of the slider 17a on the outflow end 17d side abuts the cover layers 72a and 72b. As a result, the cover layers 72a and 72b also function as pedestals to support the slider 17a and prevent the slider 17a from tilting.

As shown in FIG. 7, in the present is embodiment, in the width direction Y, the connection terminals LDU+ and LDU− for the LDU 70 are arranged between the connection terminals W+ and W− for the write head and the connection terminals R1+, R1−, R2+, and R2− for the read head. As a result, the sequence of connection terminals in the width direction Y is, from right to left in FIG. 7, the connection terminals W+ and W− for the write head, the connection terminals Hw and Hr for the heater, the connection terminal GND for the ground, the connection terminals LDU+ and LDU− for the LDU, the connection terminals R1+, R1−, R2+, and R2− for the read head, and the connection terminals HDI+, HDI− for the HDI sensor.

As shown in FIG. 5, in the present embodiment, a wiring line 101 for the write head and a wiring line 101 for the heater are drawn through the right side of the slider 17a. A wiring line 102 for the LDU, a wiring line 102 for the read head, and a wiring line 102 for the HDI sensor are drawn through the left side of the slider 17a. That is, the wiring line 101 for the write head and the wiring line 101 for the heater are provided in a manner facing the wiring line 102 for the LDU, the wiring line 102 for the read head, and the wiring line 102 for the HDI sensor through the slider 17a.

By arranging the connection terminals and configuring the wiring lines 101 and 102 to be drawn in the manner described above, crosstalk between the wiring lines 101 and 102 can be prevented. That is, currents flowing in the wiring lines for the write head and the heater are larger than currents flowing in the wiring lines for the LDU, the read head, and the HDI sensor. Therefore, it is necessary to prevent crosstalk from the wiring line for the write head to the wiring line for the read head and from the wiring line for the write head to the wiring line for the HDI sensor. By using this configuration, crosstalk between the two can be prevented.

As shown in FIG. 4 and FIG. 5, the pair of piezoelectric elements 50 uses, for example, a rectangular plate-shaped piezoelectric element (PZT element). The piezoelectric elements 50 are arranged so that their longitudinal direction (expansion/contraction direction) is parallel to the central axis C1 of the suspension 34. The two piezoelectric elements 50 are arranged on both sides of the magnetic head 17 in the width direction Y and parallel to each other. The both longitudinal ends of each piezoelectric element 50 are mounted and electrically connected to the connection pads 55 of the distal end portion 48b. Thereby, the piezoelectric elements 50 are connected to the drive wiring line W of the laminated member 48 via the connection pads 55.

According to the head suspension assembly and HDD configured as described above, by covering the non-bonding surface of the connection terminal to which the LDU 70 is bonded with the cover layers 72a and 72b, the strength of the connection terminal is increased and bending and deformation of the connection terminal can be prevented. Therefore, the distance between the connection terminal and the connection pad of the LDU is stabilized during solder bonding, and the bonding yield is improved. In addition, the possibility of cracks occurring in the solder and connection terminals is reduced, and the shock resistance of the HDD is improved. Furthermore, the head suspension assembly according to the present embodiment can be manufactured using conventional manufacturing processes without adding a new flexure manufacturing process for bonding the LDU and the connection terminal. This has the effect of cost reduction. In addition, the cover layers 72a and 72b act as pedestals to prevent the slider from tilting, and the slider can be stably mounted on the gimbal portion, thus stabilizing the bonding process.

As described above, according to the first embodiment, it is possible to obtain a head suspension assembly capable of increasing the strength of the connection terminal and improving the reliability of bonding, and a disk device having the same.

Next, the head suspension assembly of the HDD according to other embodiments will be described. In the other embodiments described below, parts identical to the first embodiment described above will be given the same reference symbols in order to omit or simplify detailed description thereof, and the description will focus on parts that differ from the first embodiment.

Second Embodiment

Figure 9:
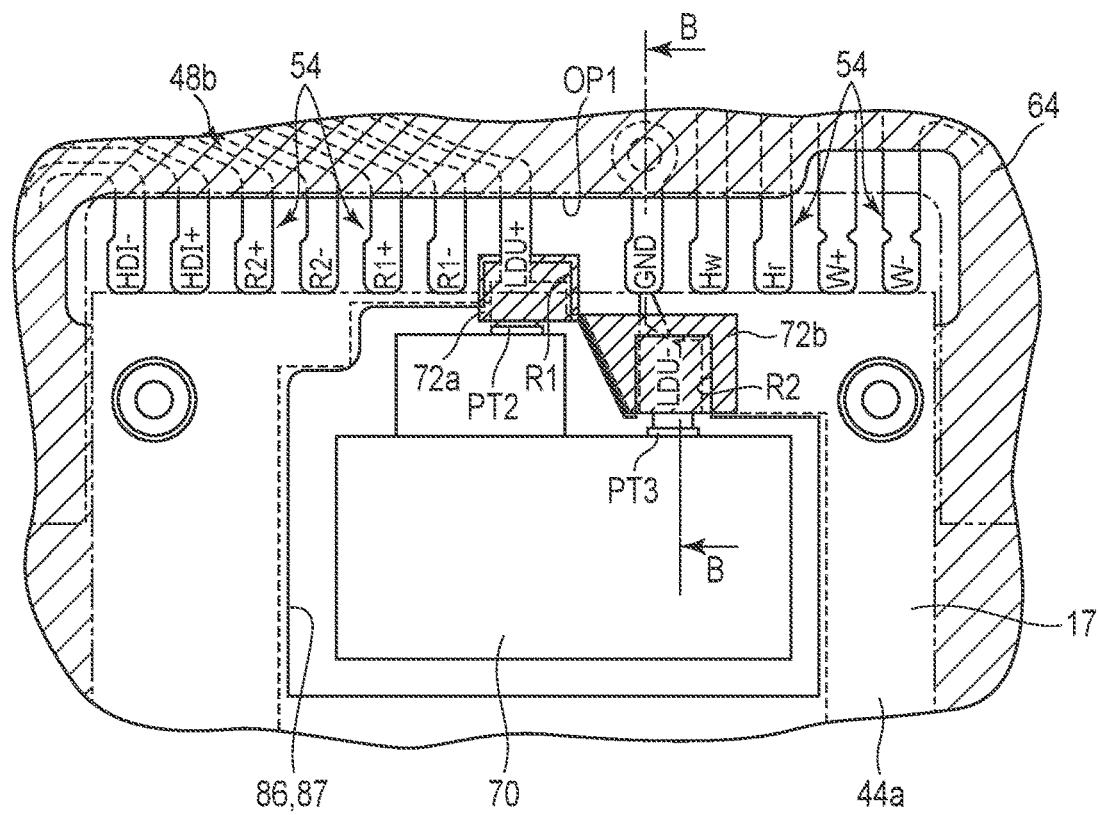
FIG. 9 is a plan view showing the connection terminals of the gimbal portion, the magnetic head, and the LDU in the head suspension assembly of the HDD according to a second embodiment.
Figure 10:
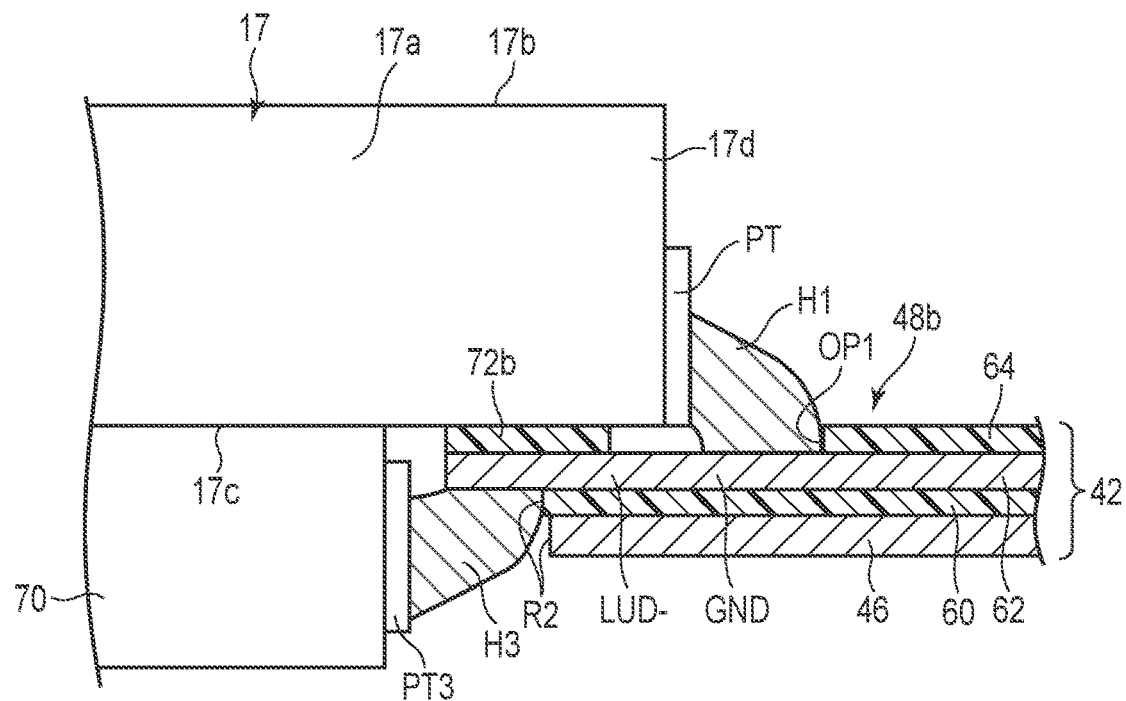
FIG. 10 is a cross-sectional view of the head joint portion taken along line B-B in FIG. 9.

FIG. 9 is a plan view schematically showing connection terminals of a gimbal portion of a head suspension assembly, a magnetic head, and an LDU in an HDD according to a second embodiment. FIG. 10 is a cross-sectional view of a head joint portion taken along line B-B in FIG. 9.

As shown in the drawing, according to the second embodiment, a connection terminal GND for grounding a head element and a connection terminal LDU− for grounding an LDU 70 are integrated as a connection terminal. That is, the connection terminal LDU− extends from the connection terminal GND to the LDU 70 side. The extended end portion of the connection terminal LDU− is located inside a recess R2. The top surface (non-bonding surface) of the extended end portion of the connection terminal LDU− and the recess R2 are covered by a cover layer 72b.

One connection pad PT of a magnetic head 17 is bonded to the top surface (bonding surface) of the connection terminal GND by solder H1, and a connection pad PT3 of the LDU 70 is bonded to the bottom surface (bonding surface) of the extended end of the connection terminal LDU– by solder H3.

In the second embodiment, other configurations of the head suspension assembly are the same as those of the head suspension assembly in the first embodiment.

According to the second embodiment of the above configuration, the number of connection terminals and wiring lines can be reduced by sharing the connection terminals GND and LDU– for grounding. This allows the interval between connection terminals to be increased, and the rigidity of the gimbal as a whole can be reduced by reducing the number of wiring lines. Other effects similar to those of the first embodiment described above can also be obtained in the second embodiment.

Third Embodiment

Figure 11:
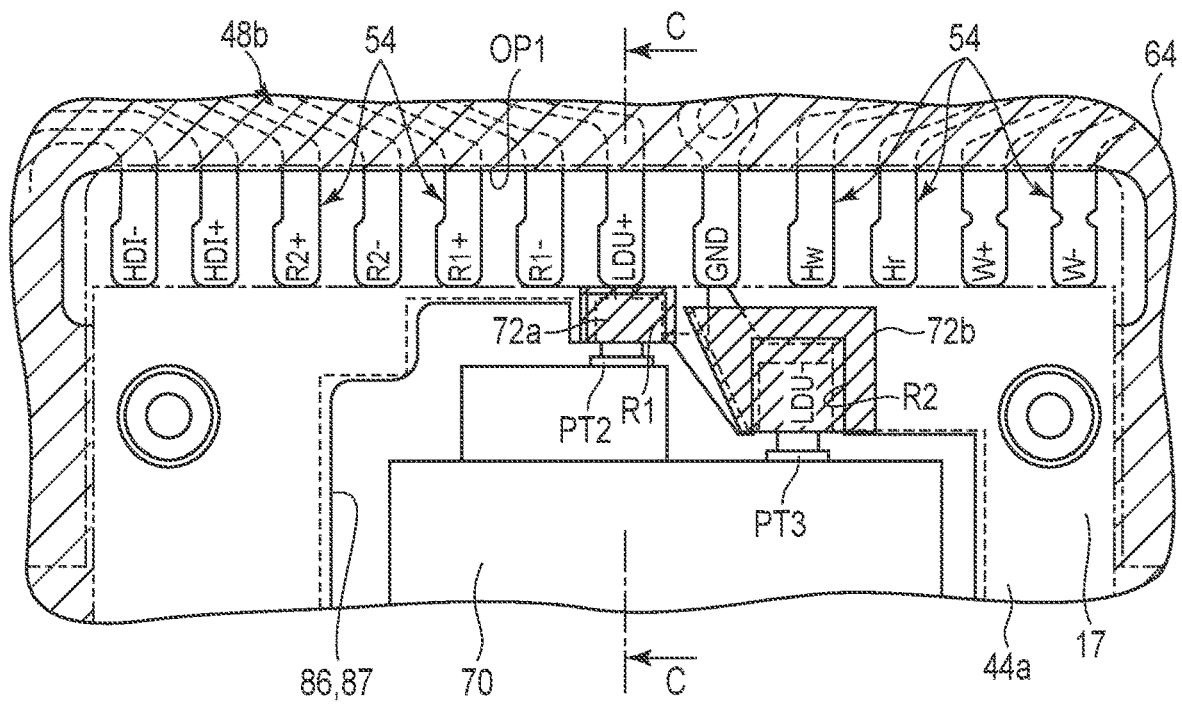
FIG. 11 is a plan view showing the connection terminals of the gimbal portion, the magnetic head, and the LDU in the head suspension assembly of the HDD according to a third embodiment.
Figure 12:
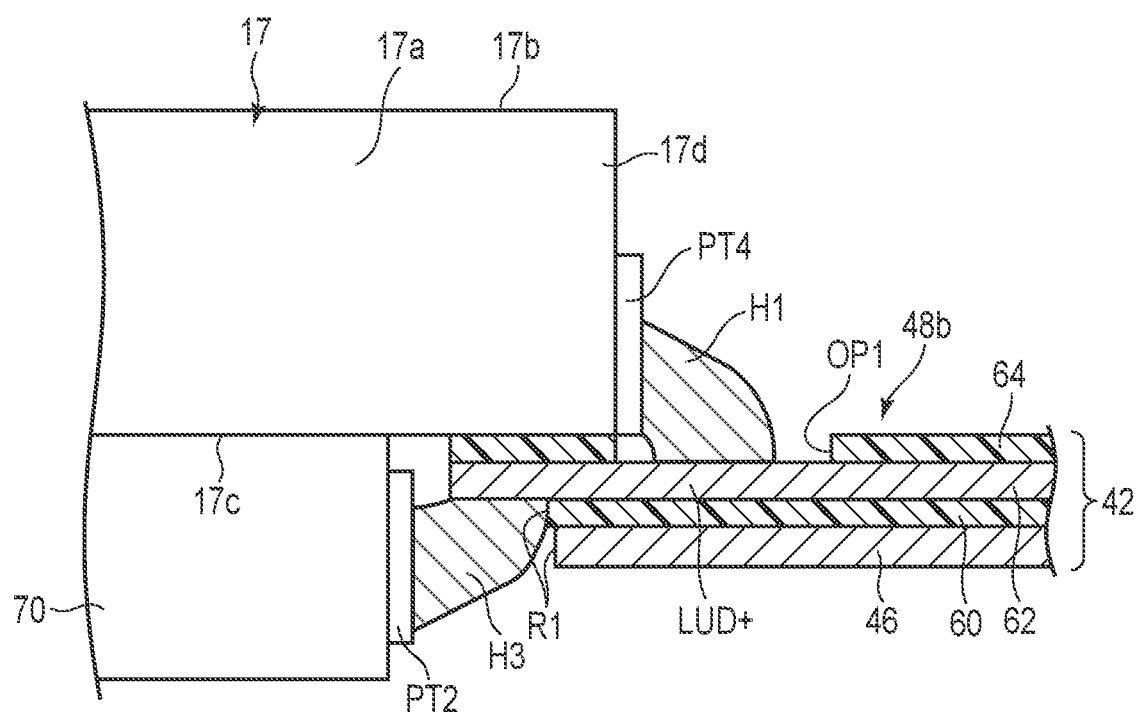
FIG. 12 is a cross-sectional view of the head joint portion taken along line C-C in FIG. 11.

FIG. 11 is a plan view schematically showing connection terminals of a gimbal portion of a head suspension assembly, a magnetic head, and an LDU in an HDD according to a third embodiment. FIG. 12 is a cross-sectional view of a head joint portion along line C-C in FIG. 11.

As shown in the drawing, according to the third embodiment, as in the second embodiment described above, a connection terminal GND for grounding a head element and a connection terminal LDU– for grounding an LDU 70 are integrated as a connection terminal. One connection pad PT of a magnetic head 17 is bonded to the top surface (bonding surface) of the connection terminal GND by solder. A connection pad PT3 of the LDU 70 is bonded to the bottom surface (bonding surface) of an extended end of the connection terminal LDU– by solder.

Furthermore, in the third embodiment, a dummy connection pad PT4 is provided at an outflow end 17d of a slider 17a. The connection pad PT4 is bonded to the top surface of a portion of a connection terminal LDU+ that is located within an opening OP1 by solder H1. A connection pad PT2 of the LDU 70 is bonded to the bottom surface (bonding surface) of an extended end of the connection terminal LDU+ by solder H3. In the third embodiment, other configurations of the head suspension assembly are the same as those of the head suspension assembly in the first embodiment.

According to the third embodiment of the above configuration, by soldering the top surface on the head side of the connection terminal LDU+ to the dummy connection pad, the bonded state of all connection terminals 54 on the head side can be made uniform. Therefore, there is no stress concentration on a specific connection terminal, and the reliability of the joint portion can be maintained over a long period of time. Other effects similar to the first embodiment described above can also be obtained in the third embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the arrangement and the number of connection terminals provided at the distal end portion of the flexure are not limited to the above-described embodiments, and can be changed as appropriate. The shape and material of the cover layer are not limited to the above-described embodiments, and can be changed as appropriate. In the above-described embodiments, the cover layer covers the entire non-bonding surface of the connection terminal, but the cover layer may cover at least a part of the non-bonding surface of the connection terminal. Even in a case where a part of the non-bonding surface is covered, the effect of improving the strength of the connection terminal can be obtained.

The materials, shapes, dimensions, etc., of the elements configuring the head suspension assembly are not limited to the embodiments described above, but can be changed in various ways as necessary. In a disk device, the number of magnetic disks is not limited to four, but may be three or less or six or more, and the number of head suspension assemblies and magnetic heads may be increased or decreased according to the number of magnetic disks installed.

What is claimed is:

1. A head suspension assembly comprising:
   a support plate;
   a wiring member including a displaceable gimbal portion and provided on the support plate; and
   a magnetic head mounted on the gimbal portion, comprising a slider, a head element provided in the slider, connection pads provided on the slider, and a laser oscillation element provided on the slider and having a connection pad, wherein
   the wiring member includes a metal plate, a base insulating layer provided on the metal plate, a conductive layer formed on the base insulating layer and configuring a plurality of wiring lines and a plurality of connection terminals, and a cover insulating layer overlaid on the conductive layer and the base insulating layer,
   the plurality of connection terminals include a plurality of first connection terminals each having a bonding surface bonded to a connection pad of the slider and a second connection terminal including a bonding surface contacting solder and bonded by the solder to the connection pad of the laser oscillation element and a non-bonding surface opposite to the bonding surface,
   the wiring member includes a cover layer covering at least a part of the non-bonding surface of the second connection terminal,
   the magnetic head includes a dummy connection pad provided on the slider, and
   the dummy connection pad is bonded to the non-bonding surface of the second connection terminal.

2. The head suspension assembly of claim 1, wherein the wiring member includes a recess formed in the base insulating layer and the metal plate, and
   the second connection terminal has an extended end portion extending into the recess, the connection pad of the laser oscillation element is bonded to a bonding surface of the extended end portion, and the cover layer covers a non-bonding surface of the extended end portion and the recess.

3. The head suspension assembly of claim 1, wherein the plurality of first connection terminals includes a first connection terminal for grounding that connects to a ground of the magnetic head, and the second connection terminal includes a second connection terminal for grounding that is integrally formed with the first connection terminal for grounding.

4. A head suspension assembly comprising:
a support plate;
a wiring member including a displaceable gimbal portion and provided on the support plate; and
a magnetic head mounted on the gimbal portion, comprising a slider, a head element provided in the slider, connection pads provided on the slider, and a laser oscillation element provided on the slider and having a connection pad, wherein
the wiring member includes a metal plate, a base insulating layer provided on the metal plate, a conductive layer formed on the base insulating layer and configuring a plurality of wiring lines and a plurality of connection terminals, a cover insulating layer overlaid on the conductive layer and the base insulating layer, and a recess formed in the base insulating layer and the metal plate,
the plurality of connection terminals include a plurality of first connection terminals each having a bonding surface bonded to a connection pad of the slider and a second connection terminal including a bonding surface bonded to the connection pad of the laser oscillation element and a non-bonding surface opposite to the bonding surface,
the wiring member includes a cover layer covering at least a part of the non-bonding surface of the second connection terminal, and
the second connection terminal includes an extended end portion extending into the recess, the connection pad of the laser oscillation element is bonded to a bonding surface of the extended end portion, and the cover layer covers a non-bonding surface of the extended end portion and the recess.

5. The head suspension assembly of claim 4, wherein the magnetic head includes a dummy connection pad provided on the slider, and
the dummy connection pad is bonded to the non-bonding surface of the second connection terminal.

6. A disk device comprising:
a disk-shaped recording medium; and
the head suspension assembly of claim 4.

7. The disk device of claim 6, wherein
the plurality of first connection terminals includes a first connection terminal for grounding that connects to a ground of the magnetic head, and the second connection terminal includes a second connection terminal for grounding that is integrally formed with the first connection terminal for grounding.

8. The disk device of claim 6, wherein
the magnetic head includes a dummy connection pad provided on the slider, and
the dummy connection pad is bonded to the non-bonding surface of the second connection terminal.

9. A head suspension assembly comprising:
a support plate;
a wiring member including a displaceable gimbal portion and provided on the support plate; and
a magnetic head mounted on the gimbal portion, comprising a slider, a head element provided in the slider, connection pads provided on the slider, and a laser oscillation element provided on the slider and having a connection pad, wherein
the wiring member includes a metal plate, a base insulating layer provided on the metal plate, a conductive layer formed on the base insulating layer and configuring a plurality of wiring lines and a plurality of connection terminals, and a cover insulating layer overlaid on the conductive layer and the base insulating layer,
the plurality of connection terminals include a plurality of first connection terminals each having a bonding surface bonded to a connection pad of the slider and a second connection terminal including a bonding surface bonded to the connection pad of the laser oscillation element and a non-bonding surface opposite to the bonding surface,
the wiring member includes a cover layer covering at least a part of the non-bonding surface of the second connection terminal, and
the plurality of first connection terminals includes a first connection terminal for grounding that connects to a ground of the magnetic head, and the second connection terminal includes a second connection terminal for grounding that is integrally formed with the first connection terminal for grounding.

* * * * *